S. BERGMAN.
PAPER FINGER BOWL AND OTHER PAPER VESSEL.
APPLICATION FILED JULY 10, 1919.
1,362,385. Patented Dec. 14, 1920.
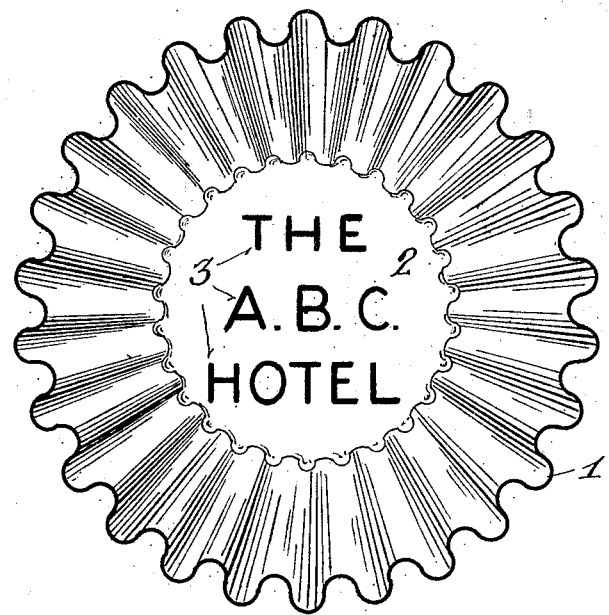

UNITED STATES PATENT OFFICE.

SIMON BERGMAN, OF NEW YORK, N. Y.

PAPER FINGER-BOWL AND OTHER PAPER VESSEL.

1,362,385.  Specification of Letters Patent.  Patented Dec. 14, 1920.

Application filed July 10, 1919. Serial No. 309,816.

*To all whom it may concern:*

Be it known that I, SIMON BERGMAN, a citizen of the United States, and a resident of the city, county, and State of New York, (whose post-office address is 37 East 18th street, New York city), have invented a new and useful Improvement in Paper Finger-Bowls and other Paper Vessels, of which the following is a specification.

The object of my invention is to provide a paper vessel such as a paper finger bowl, ice cream saucer or drinking cup, or other similar device, which will have printed on the bottom in invisible ink any suitable advertisement which remains invisible as long as the vessel contains no liquid, and when a liquid or moist substance is placed in the vessel, the printing then becomes apparent. The invention is particularly useful where a clear liquid is employed, as then the advertisement is visible through the liquid. It is preferable to use an ink which will be somewhat slow in becoming visible so that when the vessel is used with a clear water, the advertisement becomes visible while the person using the vessel is looking at the bottom.

This and other objects are accomplished by my invention, one embodiment of which is hereinafter more particularly set forth.

For a more detailed description of my invention, reference is to be had to the accompanying drawing, forming a part hereof, in which the figure shows the interior of any suitable paper vessel, as a finger bowl.

The vessel 1, to which my invention is applied, is provided with a bottom 2 on which is printed in invisible ink, any suitable advertisement 3, so that when the vessel is ready for use, the bottom appears free and clear of all printed matter. When water or other liquid is poured into the vessel, as occurs whenever the vessel is put in use, the characters 3 become visible and are preferably made visible with a slow development so that the person using the vessel will notice the appearing of the advertisement and thereby have his attention directed to it.

While I have shown and described one embodiment of my invention, it is obvious that it is not restricted thereto, but is broad enough to cover all structures that come within the scope of the annexed claim.

What I claim is:

A paper vessel adapted to hold a liquid and provided with characters placed on its interior with invisible ink so that before liquid is put in the vessel no characters will be visible, and after liquid is put in the vessel, the characters become visible and are adapted to attract the attention of the person using the vessel.

SIMON BERGMAN.